United States Patent [19]

Bristow et al.

[11] Patent Number: 5,682,749
[45] Date of Patent: Nov. 4, 1997

[54] CRITICAL TEMPERATURE CONTROL WITH VORTEX COOLING

[75] Inventors: Duncan J. Bristow, Sarnia; Raymond W. Saunders, Enniskillen Township, both of Canada

[73] Assignee: Exxon Research and Engineering Company, Florham Park, N.J.

[21] Appl. No.: 661,238

[22] Filed: Jun. 10, 1996

[51] Int. Cl.[6] .................................................. F25B 9/02
[52] U.S. Cl. .................................................. 62/5; 661/238
[58] Field of Search ............................................... 62/5

[56] References Cited

U.S. PATENT DOCUMENTS

| | | | |
|---|---|---|---|
| 3,165,149 | 1/1965 | Raible et al. | 62/5 |
| 3,173,273 | 3/1965 | Fulton | 62/5 |
| 3,208,229 | 9/1965 | Fulton | 62/5 |
| 3,654,768 | 4/1972 | Ingles et al. | 65/5 |
| 3,815,375 | 6/1974 | Ingus | 62/5 |
| 3,858,403 | 1/1975 | Dunn | 62/5 |
| 4,980,049 | 12/1990 | Huh et al. | 208/113 |
| 4,980,050 | 12/1990 | Huh et al. | 208/113 |
| 5,205,126 | 4/1993 | Schnurr et al. | 62/5 |

*Primary Examiner*—Ronald C. Capossela
*Attorney, Agent, or Firm*—James H. Takemoto

[57] ABSTRACT

Variations in the air outlet temperature of a vortex cooler which varies with the inlet temperature and pressure are maintained within precise limits by a thermocouple electrically connected to a feedback loop which controls the vortex inlet air pressure in response to the signal from the thermocouple. A pneumatic inlet air control valve, along with a microprocessor based transmitter/controller and an I/P Converter pneumatically connected to the vortex inlet air control valve comprise the feedback loop. This maintains the cold air outlet temperature of the cooler within one degree of the desired temperature, despite fluctuations in the inlet air pressure and temperature.

5 Claims, 2 Drawing Sheets

CRITICAL TEMPERATURE CONTROL WITH VORTEX COOLING

BACKGROUND OF THE INVENTION

1. Field of the Invention

The invention relates to a method for controlling the temperature of the air produced by a vortex by controlling the amount of air entering the vortex. More particularly, the invention relates to maintaining a fixed cold air outlet temperature of a vortex cooler within predetermined limits irrespective of fluctuations in the vortex inlet air temperature and pressure, by measuring the hot or cold outlet air temperature and controlling the amount of inlet air flowing into the vortex based on the measured outlet air temperature. This is useful for critical temperature applications such as on-line analyzers.

2. Background of the Disclosure

Vortex coolers are known in the art and convert a stream of compressed air into a stream of hot air and a stream of cold air. Vortex coolers and vortex cooling have found use for various cooling applications. A vortex cooler is a simple, tube-shaped device having no moving parts and requiring no electrical connections or controls. In operation, a stream of compressed air is fed into the vortex cooler, which then emits a stream of cold air from one end of the tube and a stream of hot air from the other end. Enough of a temperature difference may be produced to freeze water with the cold air emitted from one end, while boiling water with the hot air emitted from the other end. The incoming compressed air from any suitable source is fed into a vortex means in the cooler which vortexes the air passing therethrough. The vortex means generally comprises nozzles inside the cooler which inject the incoming air tangentially into a vortex chamber to produce a vortex. The hotter, lighter air migrates to the outside of the vortex, while the very cold, heavier, high viscosity air migrates to the center of the vortex. The hot air passes out one end of the tube and the cold air passes out the other end. The vortex cooler is said to utilize a Joule-Thomson gas temperature drop from adiabatic throttling. Typical vortex tubes are disclosed, for example, in U.S. Pat. Nos. 3,173,273; 3,208,229 and 3,654,768. The lack of moving parts and any electrical connections makes vortex coolers ideal for environments in which the cooler must be sealed and particularly where an explosion proof cooler and method of cooling are required. U.S. Pat. No. 3,550,390 discloses the use of two vortex coolers for reducing the refrigerating burden placed on conventional refrigerating coils employed to maintain a cool temperature in an analytical unit. The vortex coolers are controlled by means of solenoid valves which turn them either on or off. There is no suggestion of controlling either the pressure or temperature of the air fed to the coolers or to controlling the temperature of the cool air exiting the coolers.

In a theoretically ideal situation, a vortex cooler should provide a fixed cold air outlet temperature if the temperature, pressure and flow rate of the inlet air and outlet air and surrounding ambient conditions are constant. However, this is rarely the case and fluctuations in the inlet air temperature and pressure cause fluctuations in the cold air outlet temperature. When using air supplied as a utility in a plant or a refinery, for example, the temperature of the compressed air supply varies with changes in ambient conditions which can occur continuously throughout the day and evening. In a refinery, further fluctuations in the temperature of the compressed air supply occur if the compressed air mains pass close to hot units such as reactors. Some vortex coolers are furnished with on-off solenoid valves which turn the inlet air into the cooler on and off in an attempt to maintain a more even temperature in a unit being cooled. This results in unacceptable temperature fluctuations in a unit being cooled and is not suitable for applications in which precise temperature control is critical. Thus, there is a need for a method which will control the temperature of the cool air produced by a vortex cooler in a precise manner.

SUMMARY OF THE INVENTION

The present invention is directed to a method for controlling the outlet air temperature of a vortex cooler by controlling the amount of inlet air entering the cooler. Thus, the invention relates to a method for controlling the temperature of the cold or hot air flowing out of a vortex cooler, said method comprising sensing the temperature of the cold or hot air produced by the cooler and controlling the amount of inlet air entering the cooler based on the temperature of the cold or hot outlet air. More specifically, the method comprises sensing changes in the temperature of the cold or hot outlet air exiting a vortex cooler and increasing or decreasing the air flow to the cooler as needed, if the sensed temperature drops below or rises above a predetermined level. Decreasing the air flow into the vortex cooler increases the temperature of the cold outlet air, while increasing the amount of air flowing into the cooler decreases the temperature of the cold outlet air. With respect to the temperature of the hot air produced by the vortex, increasing and decreasing the inlet air flow into the vortex respectively increases and decreases the temperature of the hot air produced by the vortex. This is accomplished by using a thermocouple or other temperature sensing means to sense and determine the temperature of the cold or hot outlet air and a feedback loop connected to the temperature sensing means and to an inlet air flow control valve which increases or decreases the air flow into the vortex cooler in response to changes in the cold or hot air outlet temperature. Using the method of the invention enables the temperature of the cold air produced by the vortex cooler to be maintained within ±1° C. and even within ±0.5° C. In one particular application, the outlet temperature of the cold air produced by a vortex cooler has been maintained at 10.5° C.±0.5° C., despite fluctuations in the temperature and pressure of the air entering the cooler. This has enabled an explosion proof vortex cooling system which uses standard refinery instrument air for cooling to be used for critical applications, such as on-line analyzers.

More particularly, in one embodiment the invention relates to a method for automatically maintaining the outlet air temperature produced by a vortex within predetermined limits of a predetermined temperature when the temperature, pressure or both temperature and pressure of the inlet air into said vortex fluctuate during operation of said vortex, said method comprising continuously measuring said outlet air temperature and, based on said measured temperature, increasing or decreasing the amount of inlet air entering said vortex in an amount effective to maintain said temperature within said limits. In another embodiment the invention relates to a method for automatically maintaining the outlet temperature of cold air produced by a vortex cooler within predetermined limits of a predetermined temperature when the temperature and pressure of the inlet air being fed into said cooler vary during its operation, said method comprising:

(a) determining the pressure range of said inlet air required to achieve said cold air outlet air temperature over anticipated variations in said inlet air temperature and pressure during operation of said vortex cooler;

(b) operating said vortex cooler by passing said inlet air from an inlet air pressure control means into said vortex cooler within said operating pressure range determined in (a) to provide said cold outlet air at said predetermined temperature;

(c) continuously measuring said cold air outlet temperature using temperature measuring means which provides an electrical signal indicative of said measured temperature to a transmitter/controller means which, in ram, provides an electrical output whose value is proportional to said measured temperature;

(d) passing said electrical output from said transmitter/controller means to means for operating said inlet air pressure control means, wherein said operating means provides an output proportional to said electrical output received from said transmitter/controller means, and (e) passing said operating means output to said inlet air pressure control means, whereby said inlet air pressure varies according to said output received from said operating means.

DETAILED DESCRIPTION

Figure 1:
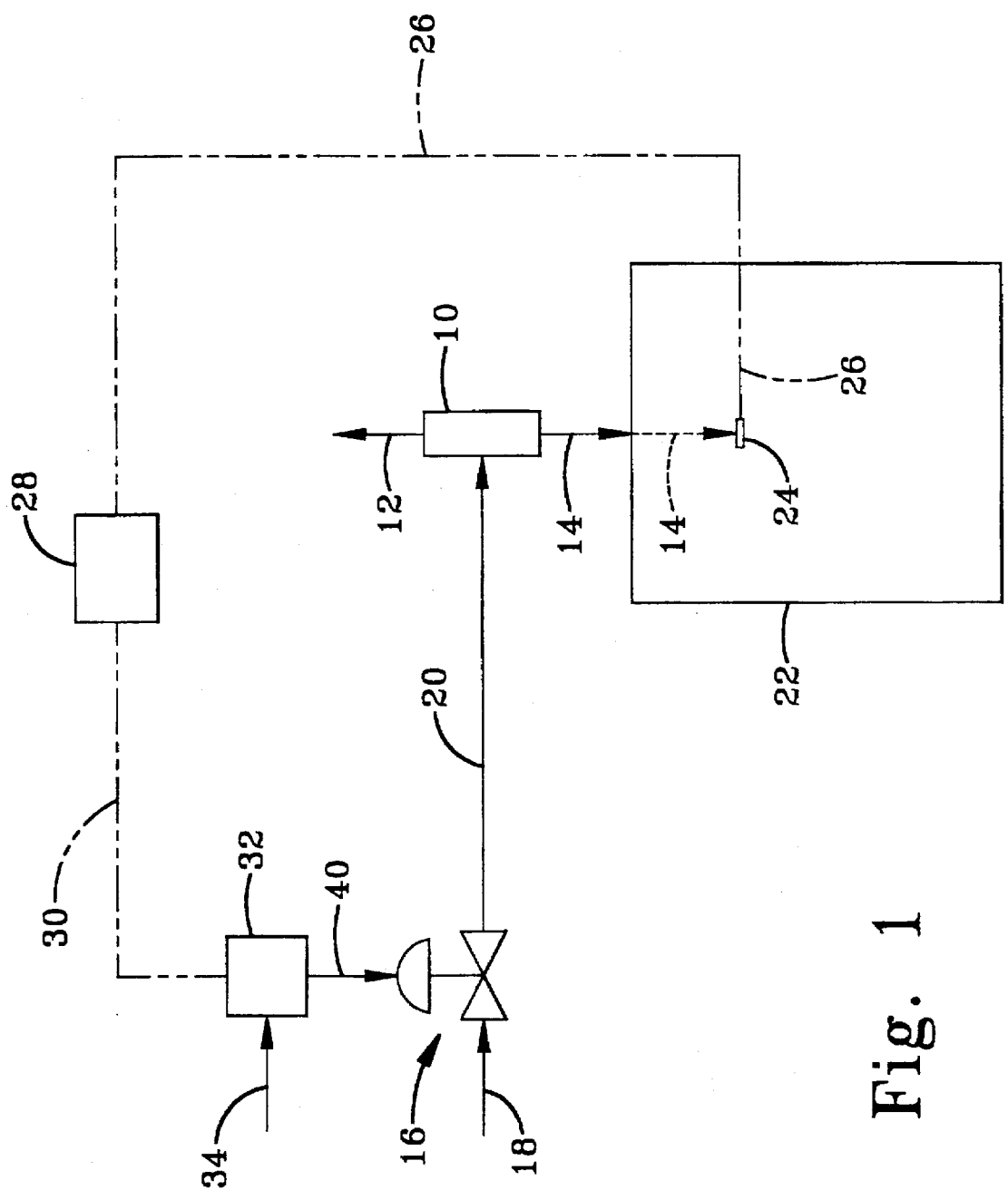
FIG. 1 is a schematic block diagram of a vortex cooling control system useful in the practice of the invention.

Referring to FIG. 1, vortex cooler 10 is shown with instrument air at a reduced pressure of about 25 psig., at ambient temperature of about 25° C., entering vortex cooler 10 via line 20. The vortex cooler 10 produces a stream of warm air 12 which exits into the ambient and a stream of cold air at a temperature of about 10° C. which exits the cooler via line 14 and enters an insulated cooling chamber 22 which contains equipment used for on-line analysis of a refinery output product stream (not shown). The amplifier must be maintained within about ±0.5° C. in order for the analyzer to produce valid and reproducible results. A thermocouple 24 inside chamber 22 is placed in the cold air stream entering the chamber and continuously produces a voltage which is proportional to the temperature of the cold air produced by the vortex cooler. Thermocouple 24 is electrically connected to a feedback loop via an electrical cable or conduit indicated by the broken lines 26, and 30. Thermocouple 24 is electrically connected via line 26 to a transmitter/-controller 28 which continuously monitors the voltage output of the thermocouple. Transmitter/controller 28 continuously monitors the temperature of the cold air based on the output voltage of the thermocouple and, based on that monitoring and prior calibration, continuously manipulates the position of proportional control valve 16. Standard refinery instrument air at ambient temperature and a fixed pressure of a value generally between 80 and 110 psig (e.g., ~100 psig.) is regulated down to about 20 psig. by means not shown and the 20 psig. air enters a current/pressure converter (I/P Converter) 32 via line 34. The transmitter/controller 28 is electrically connected via line 30 to I/P Converter 32 which, in turn, converts the electrical signal (milliamps) received from the transmitter/controller to a corresponding air pressure output which is fed via line 40 to the proportional air flow control valve 16. Valve 16 reduces the pressure of the standard refinery instrument air to a pressure which has been predetermined to produce the desired cold air temperature from the vortex cooler, with the reduced pressure air then fed via line 20 into vortex cooler 10. Increasing the opening of flow control valve 16 causes an increase in the air flow into the vortex cooler by means of increasing the pressure of the air fed into the cooler. This produces a concomitant decrease in the temperature of the cold air produced by the vortex cooler. Similarly, decreasing the opening of valve 16 results in a decrease in the air flow into the vortex cooler by means of decreasing the pressure of the air fed into the cooler. This results in an increase in the temperature of the cold air produced by the cooler.

Thus, in operation, proportional air flow control valve 16, positioned in the incoming compressed air line 18, feeds the incoming compressed air into the vortex cooler 10 via line 20, with the cold air produced by the cooler then fed into cold chamber 22 via line 14. In chamber 22 a thermocouple 24 or other suitable temperature sensing device provides a voltage output via electrical line 26 to transmitter/controller 28 which monitors the temperature of the cold air produced by the vortex cooler as a function of the electrical output from the thermocouple. The transmitter/controller continuously outputs an electrical signal to I/P Converter 32 via line 30. I/P Converter 32 continuously controls the opening of proportional air control valve 16 via compressed air fed from converter 30 to valve 16 via line 40, proportionally increasing, decreasing or maintaining the valve opening at its previous setting based on the cold air temperature signal received from the transmitter/controller 28. If the temperature of the cold air 14 exiting the vortex cooler 10 is below a predetermined level, the amount of air entering the cooler is decreased by decreasing the amount valve 16 is opened. Similarly, if the cold air temperature is too high, the amount of air fed into the cooler is increased by increasing the opening of valve 16.

In one particular embodiment of the invention, the vortex cooler used was a Model 750 Mini Vortex Cooler available from the Vortec Corporation in Cincinnati, Ohio. The automatic system used to monitor and control the cold air produced by the vortex consisted of a thermocouple to measure the actual cold air temperature, a proportional control valve for controlling the amount of air fed into the vortex cooler, a microprocessor based transmitter/-controller and an I/P Converter. The thermocouple was installed in the cold chamber in the cold air stream entering the chamber from the vortex cooler and fed back the temperature information to the transmitter/controller which continuously monitored the temperature and manipulated the proportional control valve opening through the I/P Converter. This is the same system set forth above. The thermocouple used was an ISA J type with premium accuracy specifications being less than ±1° C. which was calibrated by comparing it to a certified reference. A Moore Products Co. Model 344 transmitter/controller was used. This is a microprocessor based unit having a digital display to select the vortex cold air temperature and permits local adjustment of temperature setpoint, selection of control mode (auto/manual) and permits either automatic or manual opening and closing of the proportional air control valve. This unit incorporates a three mode PID control algorithm to mathematically calculate the required change in valve opening to achieve the temperature setpoint desired. The unit was configured upon startup to start in the "automatic" mode with the value of setpoint to be the same as when the power was removed. The output of this transmitter/controller is 4-20 milliamps (ma) which is used to control the position of the proportional air control valve. At 4 ma the valve is closed and at 20 ma the valve is fully open. Similarly, at 12 ma the valve is half open. etc. Since the proportional air control valve requires pneumatic air pressure (3–15 psig.) to operate, the ma output of the transmitter/converter cannot directly change the position of the air control valve opening, so an I/P Converter was used to convert the ma signal to a pneumatic air signal or pressure value. The I/P is a linear converter that takes the 4–20 ma output from the transmitter/controller and proportionally converts it to a corresponding 3–15 psig. (e.g., if the transmitter/controller output is 12 ma the I/P will have an output of 9 psig.). Thus, the air pressure output of the I/P Converter to the vortex cooler inlet air control valve is proportional to the magnitude of the signal received from the transmitter/controller. The air pressure output of the I/P Converter controls the opening of the inlet air control valve in an amount proportional to the pressure. While standard refinery instrument air is fed to the inlet air flow control valve 16 and from there into the vortex cooler, the pressure (80–110 psig.) is too high to be fed into the I/P Converter. The refinery instrument air is therefore regulated down to about 20 psig. by means not shown and this lower pressure air is fed into the I/P Converter which then sends a 3–15 psig. signal to the inlet air flow control valve to control the valve opening and thereby the pressure, and concomitantly the amount of air fed into the vortex cooler. The air flow control valve used in this illustration was a proportional valve wherein the opening of the valve was proportionally controlled and determined by the air pressure from the I/P Converter. In operation air pressure from the I/P Converter actuated a diaphragm which controlled the valve opening. Changes in the pressure signal from the I/P Converter proportionally changed the amount of air entering the vortex by slightly increasing or decreasing the air flow control valve opening and a concomitant corresponding increase or decrease in the pressure of the inlet air to maintain the desired cold air temperature produced by the vortex cooler. In this case it had been determined by trial and error that a nominal inlet air pressure of 25 psig. would provide the desired vortex cooler cold air outlet temperature of 10.5° C. and, further, that variations in the inlet air pressure of from 20–40 psig. would be required to maintain the 10.5° C. within a temperature range of 10.5° C.±0.5° C. as the pressure and temperature of the refinery air fed to the vortex cooler inlet air control valve varied during the day and evening.

Thus, those skilled in the art will appreciate that the method of the invention will maintain a given, predetermined vortex air outlet temperature despite fluctuations in either or both the inlet air temperature and pressure. The original configuration and setup of the transmitter/controller was achieved using a PC with configuration soft-ware. Configuration software for the transmitter/controller is provided by the manufacturer and is specific to each unit and manufacturer. It can be loaded into a PC to setup the microprocessor based transmitter/controller and to make any changes in the programming of the transmitter/controller if it is necessary. Those skilled in the art will appreciate that other temperature controllers and proportional valves will be useful in the practice of the invention and that the invention is not intended to be limited to the use of just this equipment. Other transmitter/controller manufacturers include, for example, Honeywell, Eurotherms and Omigas. The following is an illustrative, but nonlimiting example which illustrates the accuracy of the practice of the invention for maintaining a predetermined cold air output of the Model 750 Mini Vortex Cooler using this method and equipment.

Figure 2:
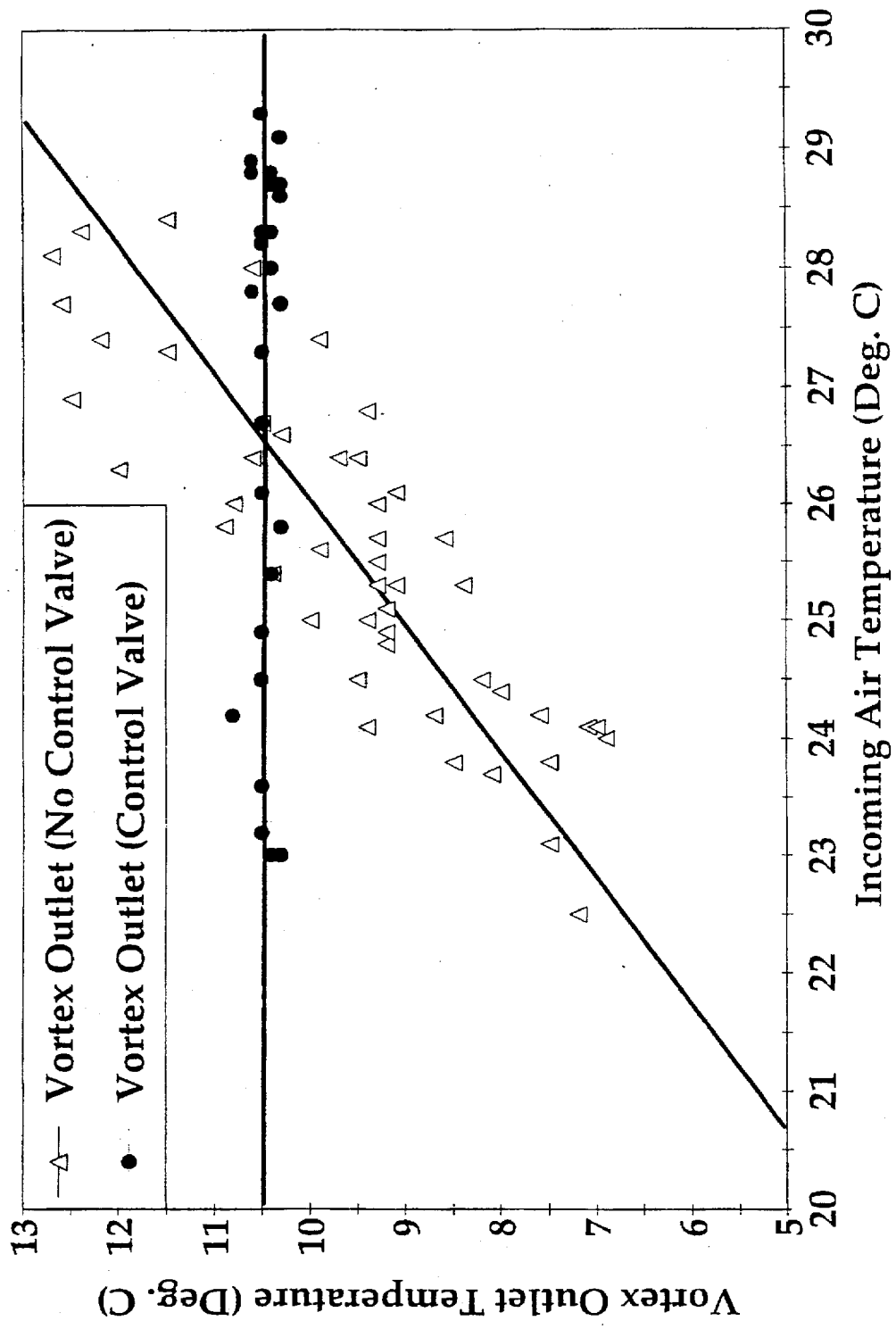
FIG. 2 is a graph illustrating the temperature of the cool air exiting a vortex cooler as a function of the incoming air temperature, both with and without the using the temperature control method of the invention.

FIG. 2 is a graph illustrating the temperature of the cool air exiting the vortex cooler as a function of the incoming air temperature, both with and without the using the temperature control method of the invention. Referring to FIG. 2 the ordinate and abscissa respectively show the outlet and incoming inlet air temperatures for the vortex cooler. In this particular illustration, relatively small variations in the temperature and pressure of the inlet air fed into the cooler produced wide swings in the temperature of the cold outlet air produced the cooler as illustrated in FIG. 2 by the triangular data points and the best fit slanted line. As mentioned above, the pressure of the inlet air required to produce a temperature of 10.5° C. had been predetermined by trial and error to be about 25 psig. Inspection of this data shows that, without the method of the invention, the outlet temperature of the inlet air exiting the vortex cooler varied over a wide range of about 7°–13° C. as a function of the incoming air temperature varying from about 22° C.–28.5° C. The inlet air temperature was changing with changes in the ambient conditions during the day and evening. Shutting the inlet air pressure control valve on and off to maintain a constant temperature produces swings in the cold air outlet temperature and does not maintain the temperature of the cold air within narrow limits. The scatter of the data points (triangular) at a given inlet air temperature without the method of the invention was due to inlet air pressure fluctuations which were also occurring. The dewpoint of refinery instrument air is controlled to prevent condensation of water present in the air, but the temperature is not controlled. The temperature fluctuates with fluctuations in ambient conditions as mentioned above. Pressure fluctuations also occur and a fluctuation of 25 psig. or more within a few hours can and does occur. In dramatic contrast, using the method of the invention, which is illustrated by the solid circle data points and the best fit horizontal line, maintained the temperature of the cold air produced by the vortex cooler at 10.5° C.±0.5° C. This precise degree of temperature control enabled the use of the explosion-proof vortex cooler for cooling the on-line analytical equipment which, in this illustration, was a pneumatic amplifier for an on-line analyzer. While no data was taken of the temperature of the warm or hot air produced by the vortex cooler in this example, those skilled in the art will appreciate that the method the invention is also useful for controlling the temperature of the hot air exiting the cooler.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A method for automatically maintaining the outlet temperature of cold air produced by a vortex cooler within predetermined limits of a predetermined temperature when the temperature and pressure of the inlet air being fed into said cooler vary during its operation, said method comprising:
   (a) determining the pressure range of said inlet air required to achieve said cold air outlet air temperature over anticipated variations in said inlet air temperature and pressure during operation of said vortex cooler;
   (b) operating said vortex cooler by passing said inlet air from an inlet air pressure control means into said vortex cooler within said operating pressure range determined in (a) to provide said cold outlet air at said predetermined temperature;

(c) continuously measuring said cold air outlet temperature using temperature measuring means which provides an electrical signal indicative of said measured temperature to a transmitter/controller means which, in turn, provides an electrical output whose value is proportional to said measured temperature;

(d) passing said electrical output from said transmitter/ controller means to means for operating said inlet air pressure control means, wherein said operating means provides an output proportional to said electrical output received from said transmitter/controller means, and (e) passing said operating means output to said inlet air pressure control means, whereby said inlet air pressure varies according to said output received from said operating means.

2. A method according to claim 1 wherein the value of said temperature measuring means is proportional to said measured outlet air temperature.

3. A method according to claim 2 wherein said transmitter/controller means comprises a microprocessor and wherein said operating means comprises a current/ pressure converting means.

4. A method according to claim 3 wherein said inlet air pressure control flow means comprises proportional valve means.

5. A method according to claim 4 wherein said current/ pressure converting means operates said inlet air valve means by providing a pneumatic pressure output to said valve means in an amount proportional to said electrical output received from said transmitter/controller means and wherein said pneumatic pressure output changes the opening of said valve in proportion to said output pressure.

* * * * *